United States Patent [19]

Jalics

[11] Patent Number: 4,499,248

[45] Date of Patent: Feb. 12, 1985

[54] POLY-DIISOPROPENYL BENZENE SYNTHESIS

[75] Inventor: George Jalics, Akron, Ohio

[73] Assignee: The Goodyear Tire & Rubber Company, Akron, Ohio

[21] Appl. No.: 493,892

[22] Filed: May 12, 1983

[51] Int. Cl.³ .............................................. C08F 4/48
[52] U.S. Cl. ................... 526/173; 526/181; 526/336
[58] Field of Search ................ 526/181, 173, 336

[56] References Cited

U.S. PATENT DOCUMENTS 2,781,334  2/1957  Welch ................................ 526/336
3,652,516  3/1972  Farrar ................................ 526/173

FOREIGN PATENT DOCUMENTS 1219682  6/1966  Fed. Rep. of Germany ...... 526/181

*Primary Examiner*—Paul R. Michl
*Attorney, Agent, or Firm*—Alvin T. Rockhill

[57] ABSTRACT

It has been unexpectedly found that meta-diisopropenyl benzene can be polymerized into poly-m-diisopropenyl benzene with a relatively narrow molecular weight distribution and with only a small degree of crosslinking (gel formation) if done in the presence of at least one alpha-olefin containing from 2 to 12 carbon atoms in tetrahydrofuran (solvent) at low temperatures employing an alkyl lithium initiator. The poly-m-diisopropenyl benzene produced by employing this technique has an isopropenyl moiety on almost every diisopropenyl benzene repeat unit in the polymer. This polymer is particularly useful since its pendant isopropenyl groups can be further reacted with other compounds leading to polymers with various functionalities. This technique can also be employed in the synthesis of copolymers containing repeat units derived from meta-diisopropenyl benzene and one or more other monomers. The copolymers synthesized using the process of this invention contain an essentially quantitative number of unreacted isopropenyl groups on the meta-disisopropenyl benzene repeat units in the polymer chain.

37 Claims, No Drawings

POLY-DIISOPROPENYL BENZENE SYNTHESIS

BACKGROUND OF THE INVENTION

Diisopropenyl benzene is a monomer that is useful in the synthesis of many useful copolymers. For example, it can be copolymerized with phenol, alkyl phenols, meta-dialkoxy benzenes, 1-mercapto-3-alkoxy benzenes, diarylkoxy benzenes, and 1,2,3-trialkoxy benzenes, to produce polymeric reaction products that are useful for various purposes including resins for injection molding.

Homopolymerizations of diisopropenyl benzene are also known. For example, the cationic homopolymerization of meta-diisopropenyl benzene produces polymers containing predominantly indane structure.

An anionic homopolymerization of meta-diisopropenyl benzene in a polar solvent at low temperatures was disclosed in Makromol. Chem., "Anionic Polymerization and Copolymerization of 1,3- and 1,4-Diisopropenylbenzene," Vol. 183, pages 2787-2797 (1982). However, this article indicates that the polymer formed undergoes crosslinking and that the reaction medium gels after long reaction times (high monomer conversion).

SUMMARY OF THE INVENTION

This invention reveals a technique for the homopolymerization of meta-diisopropenyl benzene which results in the formation of poly-m-diisopropenyl benzene with a low degree of intermolecular crosslinking at high monomer conversions (after long reaction times) and high molecular weights. The polymerizations of this invention are conducted at temperatures of −40° C. or colder employing tetrahydrofuran (THF) as the solvent and an alkyl lithium as the initiator in the presence of at least one alpha-olefin containing from 2 to 12 carbon atoms, such as ethylene or propylene.

The process of this invention can also be employed in the synthesis of copolymers containing meta-diisopropenyl benzene and one or more additional monomers, such as alpha-methyl styrene, styrene, vinyl toluene, butadiene, isoprene, and the like. Thus, this invention reveals a process for the synthesis of polymers containing from about 1 weight percent to 100 weight percent, diisopropenyl benzene and from 0 to about 99 weight percent of at least one other monomer comprising: polymerizing from about 1 to 100 weight percent diisopropenyl benzene and from 0 to about 99 weight percent of at least one other monomer in an organic solvent containing at least about 5 weight percent of at least one ether at a temperature of −40° C. or colder in the presence of at least one alpha olefin containing from 2 to 12 carbon atoms.

DETAILED DESCRIPTION

In order to practice the process of this invention a reaction mixture is prepared which contains meta-diisopropenyl benzene monomer, at least one alkyl lithium initiator, at least one alpha-olefin containing from 2 to 12 carbon atoms, and an organic solvent containing at least 5 percent by weight of at least one ether. The preferred ethers for use in this invention are cyclic ethers, such as tetrahydrofuran (diethylene oxide) and tetrahydrofuran (pentamethylene oxide). The polymerizations of this invention must be conducted in an organic solvent containing at least 5 weight percent of at least one ether. It is preferred for the organic solvent used in the practice of this invention to contain at least about 80 weight percent tetrahydrofuran. The most preferred solvent for use in the practice of this invention is relatively pure tetrahydrofuran (THF).

The polymerizations of this invention must be conducted at a temperature of −40° C. (−40° F.) or colder. It is preferred for the polymerizations of this invention to be carried out at a temperature of −60° C. (−76° F.) or less, and is most preferred for the temperature used to be about −80° C. (−112° F.).

If a mixed solvent is employed it will be necessary for its components, to be selected with care since some will be unsatisfactory for various reasons even in small amounts while others can be tolerated to much higher concentrations. Since the polymerizations of this invention are carried out at low temperatures the component of the solvent employed should be selected so as to result in a solvent that is in the liquid state at the temperature at which the polymerization will be conducted. For example, cyclohexane has a freezing point of about 6° C.; therefore, it is a solid at the low temperatures required for the polymerizations of this invention. As a result of this, a large quantity of cyclohexane in the solvent used for carrying out this invention will result in the medium freezing. Thus, a large amount of cyclohexane in the organic solvent utilized will be unsatisfactory. Toluene, on ther other hand, has a freezing point of about −95° C.; therefore, freezing will generally not be a problem if toluene is employed as one of the components of the solvent. However, the use of large amounts of toluene in the solvent may result in gelation. Low solubility is another factor that must be taken into account when selecting suitable components for the solvent. Other conceivable solvent components, such as ketones and alcohols, will destroy the lithium catalyst utilized in the polymerizations of this invention and are therefore, generally not satisfactory in large quantities. However, since the polymerizations of this invention are carried out at very low temperatures it is contemplated that small amounts of ketones can be employed as a component of the solvent. Normally, if a mixed solvent is employed it will contain THF and one or more aliphatic hydrocarbons, aromatic hydrocarbons, halogenated aliphatic hydrocarbons, halogenated aromatic hydrocarbons, or ethers. Some representative examples of organic solvents that can be used in conjunction with THF in various amounts include pentane, hexane, octane, toluene, 1-chloro pentane, 1-chloro hexane, and chloro benzene.

The reaction mixtures that are employed in carrying out the polymerization of this invention can contain from about 1 weight percent to about 50 weight percent monomers based on the total reaction mixture. It is generally preferred for the reaction mixture to contain from 15 weight percent to 25 weight percent monomers. It is generally more preferred for the reaction mixtures of this invention to contain about 20 weight percent monomers.

It is within the scope of this invention for meta-diisopropenyl benzene to be the only monomer that is polymerized in such a reaction mixture. Thus, a reaction mixture can contain from about 1 weight percent to about 50 weight percent, meta-diisopropenyl benzene monomer, based on the total reaction mixture. It is generally preferred for such reaction mixtures, which utilize only meta-diisopropenyl benzene as the monomer in the polymerization, to contain from about 15 weight percent to about 25 weight percent meta-diisopropenyl benzene and it is more preferred for such reaction mixtures to contain about 20 weight percent meta-diisopropenyl benzene.

Since meta-diisopropenyl benzene can be homopolymerized by employing the process of this invention while maintaining an essentially quantitative number of unreacted isopropenyl groups on the meta-diisopropenyl benzene repeat units (repeat units derived from meta-diisopropenyl benzene) in the polymer produced, it will be apparent to those skilled in the art that meta-diisopropenyl benzene can be copolymerized with various other monomers while maintaining an essentially quantitative number of unreacted isopropenyl groups. In other words, if meta-diisopropenyl benzene does not undergo intermolecular crosslinking with resulting gelation in a homopolymerization it will be generally do so in a copolymerization. However, other monomers used in such a copolymerization can be involved in such crosslinking. Thus, comonomers used in conjunction with meta-diisopropenyl benzene must be selected so as to provide the desired degree of crosslinking and gelation in the polymer synthesized.

If only a minimal degree of crosslinking is desired, then the other monomers selected for copolymerization with meta-diisopropenyl benzene should in general be selected from monomers that do not exhibit a tendency toward intermolecular crosslinking and gelation. Some examples of other monomers that can be employed in such copolymerizations with only minimal intermolecular crosslinking include conjugated and nonconjugated diolefins, aliphatic and aromatic unsaturated hydrocarbon monomers, halogenated aliphatic unsaturated monomers, halogenated aromatic monomers, and other vinyl containing monomers. Some representative examples of comonomers that can be polymerized with meta-diisopropenyl benzene to synthesize polymers in which the process of this invention is useful include styrene, isoprene, alkyl acrylates, such as methyl acrylates, ethyl acrylates, butyl acrylate, methyl methacrylate and the like; vinylidene monomers having one or more terminal $CH_2=CH-$ groups; vinyl aromatics such as $\alpha$-methylstyrene, bromostyrene, chlorostyrene, fluorostyrene, vinylphenol, 3-hydroxy-4-methoxystyrene, vinylanisole, $\beta$-nitrostyrene, and the like; $\alpha$-olefins such as ethylene; vinyl halides, such as vinylbromide, chloroethene (vinylchloride), vinylfluoride, vinyliodide, 1,2-dibromoethane, 1,1-dichloroethylene (vinylidene chloride), 1,2-dichloroethylene, and the like; vinyl esters such as vinyl acetate; $\alpha,\beta$-olefinically unsaturated nitriles, such as methacrylonitrile; $\alpha,\beta$-olefinically unsaturated amides such as acrylamide, N-methyl acrylamide, N-t-butylacrylamide, N-cyclohexyl acrylamide, diacetone acrylamide, methacrylamide, N-ethyl methacrylamide, and the like; vinyl pyridine; n-octyl methacrylate, dodecyl methacrylate, methyl ethacrylate, and ethyl ethacrylate; haloalkyl acrylates such as chloropropyl acrylate; methacrylates; hydroxyethylacrylate; polyfunctional compounds such as ethylene glycol dimethacrylate, diethylene glycol diacrylate, divinyl benzene, alkenyl pentaerythritol, methylene-bis-acrylamide, and the like; $\alpha,\beta$-olefinically unsaturated carboxylic acids containing from 3 to 10 carbon atoms such as methacrylic acid, acrylic acid, crotonic acid, $\beta$-acryloxy propionic acid, sorbic acid, hydrosorbic acid, $\alpha$-chlorosorbic acid, cinnamic acid, $\beta$-styrlacrylic acid, itaconic acid, citraconic acid maleic acid, fumaric acid, mesaconic acid, aconitic acid, and glutaconic acid.

In the polymerization of meta-diisopropenyl benzene monomer with one or more of the above-mentioned monomers there can be competing or side reactions which take place. Therefore, the choice of reactants, process conditions, order of addition of reactants and the like, should be selected in order to produce a useful polymer containing meta-diisopropenyl benzene repeat units. In general, the resulting copolymer, terpolymer, or multi-monomer polymer should contain at least about 1 percent by weight of meta-diisopropenyl benzene. If p-diisopropenyl benzene is selected as a comonomer for use in the polymerization of this invention then intermolecular crosslinking will result (normally both of its diisopropenyl groups will react in the polymerization). Thus, if p-diisopropenyl benzene is selected as a comonomer for such polymerizations the amount used will normally be less than about 5 percent by weight based upon total monomers. In such polymerizations it will generally be preferable to keep the amount of p-disisopropenyl benzene monomer employed below about 2 percent by weight based upon total monomers. Some comonomers that can be used in much larger amounts (up to about 99 percent by weight based upon total monomers) without appreciable intermolecular crosslinking include alpha methyl styrene, styrene, vinyl toluene, butadiene, isoprene, and the like.

The reaction mixtures of this invention will also contain at least one alkyl lithium initiator. The alkyl groups in phase initiators will normally contain from 2 to 12 carbon atoms. The alkyl lithium initiators that are preferred for use in this invention contain from 2 to 6 carbon atoms. Some representative examples of such initiators include ethyl lithium, propyl lithium, pentyl lithium, and hexyl lithium. The most preferred initiator for use in this invention is n-butyl lithium. The amount of initiator employed in such polymerizations will vary with the desired molecular weight of the polymer being synthesized. The molecular weight of the polymer produced will normally vary linearly with the receptacle of the square root of the initiator concentration. Thus, molecular weight can be increased by using a lesser amount of initiator. Generally, from about 0.01 phm (parts per hundred parts of monomer) to about 5 phm of the alkyl lithium initiator or mixture of alkyl lithium initiators is employed in the reaction mixture. It is normally preferred for 0.05 phm to 1 phm of the alkyl lithium initiator to be employed. It is most preferred for 0.1 phm to 0.5 phm of the alkyl lithium initiator to be used. It is generally preferred for the alkyl lithium initiator to be the last component added in the preparation of the reaction mixtures of this invention. A person skilled in the art will realize that the amount of initiator needed will vary with the size and cleanliness of the reaction vessel used. Usually a larger amount of initiator will be required if the polymerization reactor is not well cleaned than is required if it was well cleaned before charging it with the reaction mixture. Even very small amounts of impurities absorbed on the walls of a reactor can cause inactivation of a portion of the catalyst. This problem of catalyst inactivation, which can hardly be avoided even in laboratory runs, becomes practically unavoidable when operating on a commercial scale. It should also be realized that generally the amount of initiator required in phm will decrease with increasing reactor size. This is due to larger reactors having a lower surface to volume ratio. The amount of initiator needed to act as a scavenger in such polymerizations can easily be ascertained. It is generally preferred for the alkyl lithium initiator to be the last component added in the preparation of the reaction mixtures of this invention.

It is necessary for the reaction mixtures of this invention to contain at least one alpha olefin containing from 2 to 12 carbon atoms. It is preferred for the reaction mixtures of this invention to contain an alpha olefin containing from 2 to 4 carbon atoms. The most preferred alpha olefins for use in this invention are ethylene (ethene) and/or propylene (propene). Since ethylene has a boiling point of −102° C. it will be a gas at the temperatures at which the polymerizations of this invention are normally conducted. Therefore, it will generally be necessary to carry out the polymerizations of this invention in pressure vessels if done in the presence of ethylene. Propylene has a boiling point of −48° C. and is therefore a liquid at the temperatures at which the polymerizations of this invention are conducted. Thus, it will normally be more convenient to use propylene since it is in the liquid state at the temperatures used to carry out the polymerization of this invention.

Only a minimal amount of ethylene and/or propylene needs to be present in the reaction mixtures of this invention. Propylene is much less effective at preventing intermolecular crosslinking and resulting gel formation than is ethylene, therefore, if propylene is selected for this purpose somewhat larger quantities must be employed than if ethylene is used. One skilled in the art will easily be able to ascertain the optimum amount of ethylene and/or propylene that will need to be present in the reaction mixture in order to obtain the properties desired in the polymer produced. It has been observed that 1 weight percent of propylene in the reaction mixture is very adequate for practicing the process of this invention. It is contemplated that as little as 0.01 weight percent of ethylene and/or propylene can be present in the reaction mixtures of this invention in order to inhibit intermolecular crosslinking and gel formation. There does not appear to be an upper limit on the amount of ethylene and/or propylene that can be employed in the polymerization of this invention. However, in practice, it is contemplated that no more than 5 percent by weight based upon the total reaction mixture, of alpha olefins is necessary. Typically, the reaction mixtures of this invention will contain an effective amount of at least one alpha olefin which will generally range from 0.1 weight percent to 1 weight percent based upon the total reaction mixture.

In meta-diisopropenyl benzene homopolymerizations paths A, B, and C shown in the reaction scheme below are possible.

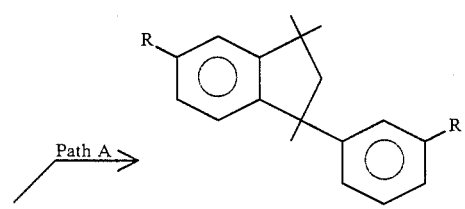

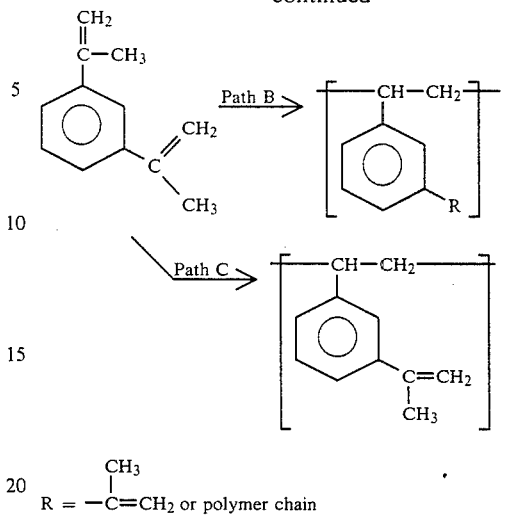

$$R = -\overset{CH_3}{\underset{|}{C}}=CH_2 \text{ or polymer chain}$$

Path A is predominate in the cationic homopolymerization of meta-diisopropenyl benzene which produces a polymer containing predominantly indane structure. Path B occurs in the anionic homopolymerization of meta-diisopropenyl benzene in a polar solvent at low temperatures (−30° C.). R represents either an isopropenyl group or the polymer chain. Thus, if R represents a continuation of the polymer chain it is indicative of a branch point in the polymer. In cases wherein R represents a continuation in the polymer chain it also represents a points of intermolecular crosslinking. Such points of intermolecular crosslinking, where R represents a continuation of the polymer chain, are more prevalent in high molecular weight polymers (after long polymerization times). In polymerizations where a significant amount of intermolecular crosslinking occurs gelation normally results. The polydispersity of a polymer normally increases with increasing amounts of intermolecular crosslinking in the polymer. Polydispersity is defined as the weight average molecular weight of a polymer ($M_w$) divided by the number average molecular weight of the polymer ($M_n$).

Path C represents the process of this invention wherein meta-diisopropenyl benzene is homopolymerized in an organic solvent containing at least 50 weight percent THF at a temperature of −40° C. or colder in the presence of at least one alpha olefin containing from 2 to 12 carbon atoms. The α-olefins which are employed in the reaction mixtures of this invention in order to inhibit branching (intermolecular crosslinking) do not copolymerize with the m-disisopropenyl benzene to an appreciable extent, if at all. Thus, repeat units derived from these α-olefins are not incorporated into the polymer formed. As can be seen, the process of this invention results in a polymer containing an essentially quantitative number of unreacted isopropenyl groups on the isopropenyl benzene repeat units in the polymer. In other words, almost every diisopropenyl benzene repeat unit in the polymer chain contains an unreacted isopropenyl group. Thus, very few, if any, of the diisopropenyl groups on the polymer chain have been involved in intermolecular crosslinking reactions. There is apparently enough difference between the reactivity of the two isopropenyl groups of meta-diisopropenyl benzene for one of them to react in the polymerization of this invention while the other isopropenyl group remains unreacted. It has been determined that there is not a sufficient difference between the reactivity of the two isopropenyl groups of p-diisopropenyl benzene for one of them to remain unreacted while utilizing the polymerization process of this invention.

The following examples are included to further illustrate the process of this invention and to compare it with other polymerizations outside of its scope. Such comparisons clearly show the unexpected result achieved by carrying out the process of this invention. The following examples are merely for the purpose of illustration and are not to be regarded as limiting the scope of the invention or the manner in which it can be practiced. Unless specifically indicated otherwise, parts and percentages are given by weight. Percent gel was calculated as being the percentage of a given polymer held up by a 100 mesh screen (percentage of the polymer that did not pass through the screen).

EXAMPLE 1

This polymerization was conducted in a Fisher-Porter pressure vessel having a capacity of about 500 ml (milliliters) which was equipped with a magnetic stirrer. This Fischer-Porter vessel was placed in a cooling mixture containing acetone and solid carbon dioxide (dry ice). This mixture had a temperature of about $-80°$ C. 200 ml of THF and 40 ml of meta-diisopropenyl benzene were placed in the Fisher-Porter vessel. After this mixture had remained in the vessel for a sufficient length of time to reach a temperature of about $-80°$ C., 3 ml of a 1.6 normal solution of n-butyl lithium in hexane was added. Then the Fisher-Porter vessel was sealed and pressurized to $2.07 \times 10^5$ pascals (30 psi). This reaction mixture was allowed to polymerize for about 90 minutes. The polymer cement produced was poured into methanol and a white powder precipitated which was filtered and dried under reduced pressure at room temperature. The polymer produced was then characterized by nuclear magnetic resonance spectrometry and gel permeation chromatography. The nuclear magnetic resonance (NMR) analysis was done on a Varian EM 360 (60 megahertz), a Varian HR 300 (300 megahertz), and a Varian CFT 20 (carbon 13). The NMR analysis revealed a very clean homopolymer structure with essentially quantitative residual isopropenyl group content. That is, the polymer appeared to be linear with only of the isopropenyl groups being reacted (an unreacted isopropenyl group appeared on every diisopropenyl benzene repeat unit in the polymer). The gel permeation chromatography revealed a number average molecular weight of 53,000 and a weight average molecular weight of 82,000. Thus, the polydispersity of the polymer produced was about 3.4. The polymer yield was determined to be 71 percent of the theoretical yield. Gel was determined to be less than 1 percent by weight.

EXAMPLE 2

The same procedure that was employed in Example 1 was used here except that 20 ml of meta-diisopropenyl benzene and 20 ml of alpha methyl styrene were substituted for the 40 ml of meta-diisopropenyl benzene used in Example 1. Thus, a copolymer of alpha methyl styrene and meta-diisopropenyl benzene was synthesized. It was determined using the techniques explained in Example 1 that this polymer had a number average molecular weight of 34,000 and a weight average molecular weight of 63,000. The polymer produced therefor had a polydispersity of 1.86. It was also determined that the polymer produced had an essentially quantitative residual isopropenyl group content. This polymerization resulted in a yield of 60 percent and had less than 1 percent gel.

EXAMPLE 3

A Fisher-Porter pressure vessel equipped with a magnetic stirrer and having a capacity of about 500 ml was used in carrying out this experiment. It was placed in a cooling solution containing acetone and dry ice. 200 ml of THF and 40 ml of meta-diisopropenyl benzene were added to the Fisher-Porter pressure vessel and allowed to cool to a temperature of about $-80°$ C. The pressure vessel was then tightly sealed and pressurized to $2.07 \times 10^5$ pascals with ethylene. After about 5 minutes the pressure vessel was opened and 8 ml of a 1.25 normal solution of normal-butyl lithium in hexane was added. The Fisher-Porter pressure vessel was then immediately pressurized with ethylene to a pressure of $2.07 \times 10^5$ pascals. The reaction mixture was allowed to polymerize for 30 minutes. The polymer cement produced was poured into methyl alcohol. which caused the polymer synthesized to precipitate. It was filtered and dried under reduced pressure at room temperature. The polymer was then characterized using the techniques described in Example 1. It was determined that the polymer produced had a number average molecular weight of 5,700, a weight average molecular weight of 18,000 and a polydispersity of 3.16. A polymer yield of 91 percent was achieved with gel being less than 1 percent.

EXAMPLE 4

In this experiment a homopolymerization of meta-diisopropenyl benzene was conducted in a 3 liter three-neck flask. The flask was placed in a cooling solution containing acetone and dry ice whch was at a temperature of about $-80°$ C. 1,500 ml of RHF and 400 ml (366.5 g) of meta-diisopropenyl benzene monomer was added. This solution of meta-diisopropenyl benzene monomer and THF was allowed to cool to about $-80°$ C. and 70 ml of a 1.6 normal solution of n-butyl lithium in hexane was added. The flask was then tightly sealed and pressurized with ethylene to a pressure of $3.4 \times 10^4$ pascals. The polymer produced was recovered and characterized as described in Example 1. It was determined that the polymer produced had a number average molecular weight of 17,000, a weight average molecular weight of 32,300, and a polydispersity of 1.9. A polymer yield of 38 percent was achieved and gel was kept below 1 percent by weight.

EXAMPLE 5

The procedure specified in Example 3 was employed in this experiment except that propylene was substituted for ethylene and that 10 ml of the normal-butyl lithium solution was added instead of the 8 ml that was used in Example 3. 33 grams of dry polymer was recovered which represents a yield of 90 percent. It was determined that the polymer synthesized had a number average molecular weight of 14,100, a weight average molecular weight of 30,800, and a polydispersity of 2.18. Gel was determined to represent less than 1 percent.

COMPARATIVE EXAMPLE 1

The experiment specified in Example 3 was repeated except the polymerization was conducted in the absence of the ethylene employed in Example 3. After only 12 minutes the reaction mixture had completely gelled. In fact, gel was determined to be 100 percent.

This example clearly shows that an alpha olefin must be present in the polymerizations of this invention. In this experiment conducted in the absence of an alpha olefin the reaction mixture gelled very quickly. In Example 3, which was conducted in the presence of a small amount of an alpha olefin, relatively little gel was produced (less than 1 percent) and a relatively high molecular weight polymer was obtained ($M_w = 18,000$).

COMPARATIVE EXAMPLE 2

This experiment was conducted using the same procedure that was specified in Example 1 except that no ethylene was employed in the reaction mixture and that the polymerization was conducted at $-20°$ C. instead of $-80°$ C. In this experiment the reaction mixture gelled instantly. Thus, this comparative example further reveals a criticality of the conditions of the process of this invention. In other words, the reaction mixtures of this invention must contain an alpha olefin and be conducted at a temperature of $-40°$ C. or colder. If such a polymerization is conducted in the absence of an alpha olefin the reaction mixture will gel very quickly.

COMPARATIVE EXAMPLE 3

This polymerization was conducted in a Fisher-Porter pressure vessel having a capacity of about 500 ml which was equipped with a magnetic stirrer and specially built internal vial capable of releasing its contents after the vessel was pressurized. This specially built pressure vessel makes it possible to add the alkyl lithium initiator to the polymerization mixture after the reaction vessel has been pressurized with ethylene. This pressure vessel was placed in a constant temperature bath at a temperature of about 10° C. 60 ml of THF and 20 ml of meta-disisopropenyl benzene were placed in the pressure vessel. 3 ml of a 1.6 normal solution of n-butyl lithium in hexane was added to the internal vial. Then the Fisher-Porter vessel was sealed and pressurized to $2.8 \times 10^5$ pascals (40 psi). After a few minutes the alkyl lithium initiator was released into the reaction mixture. The reaction mixture gelled into a hard solid in about 3 minutes.

This example clearly shows the criticality of conducting the polymerizations of this invention at low temperatures.

COMPARATIVE EXAMPLE 4

The same procedure that was employed in Comparative Example 3 was used here except that the polymerization was conducted at a temperature of about 0° C. In this experiment the reaction mixture gelled in only about 18 minutes. This example also indicates that low temperatures are required for the polymerization of this invention.

While certain representative embodiments and details have been shown for the purpose of illustrating the invention in these examples, it will be apparent to those skilled in this art that various changes and modifications can be made therein without departing from the scope of this invention.

What is claimed is:

1. A process for the synthesis of polymers with a low degree of intermolecular crosslinking containing from about 1 weight percent to 100 weight percent diisopropenyl benzene and from 0 to about 99 weight percent of at least one other monomer comprising: polymerizing from about 1 to 100 weight percent diisopropenyl benzene and from 0 to about 99 weight percent of at least one other monomer in a reaction mixture utilizing an organic solvent containing at least 5 weight percent of at least one ether at a temperature of $-40°$ C. or colder utilizing an alkyl lithium initiator in the presence of at least 0.01 weight percent based upon the total reaction mixture of at least one alpha olefin containing from 2 to 12 carbon atoms; wherein the polymers produced have a gel content of less than 1 percent by weight.

2. A process as specified in claim 1 wherein said organic solvent contains at least about 80 weight percent tetrahydrofuran.

3. A process as specified in claim 2 wherein said organic solvent is tetrahydrofuran.

4. A process as specified in claim 1 wherein said temperature is $-60°$ C. or colder.

5. A process as specified in claim 4 wherein said temperature is about $-80°$ C.

6. A process as specified in claim 1 wherein said other monomer is alpha-methyl styrene.

7. A process as specified in claim 1 wherein said alkyl lithium initiator contains from 2 to 6 carbon atoms.

8. A process as specified in claim 7 wherein said alkyl lithium initiator is normal butyl lithium.

9. A process as specified in claim 1 wherein said alpha olefin contains from 2 to 4 carbon atoms.

10. A process as specified in claim 9 wherein said alpha-olefin is selected from the group consisting of ethylene and propylene.

11. A process as specified in claim 1 wherein said diisopropenyl benzene is meta-diisopropenyl benzene.

12. A process for the homopolymerization of meta-diisopropenyl benzene monomer which results in the formation of poly-meta-diisopropenyl benzene with a low degree of intermolecular crosslinking comprising: polymerizing said meta-diisopropenyl benzene in a reaction mixture containing said meta-diisopropenyl benzene in an organic solvent containing at least 5 weight percent tetrahydrofuran at a temperature of $-40°$ C. or colder utilizing an alkyl lithium initiator in the presence of at least 0.01 percent by weight of at least one alpha-olefin containing from 2 to 12 carbon atoms.

13. A process as specified in claim 12 wherein said organic solvent is tetrahydrofuran.

14. A process as specified in claim 13 wherein said temperature is $-60°$ C. or colder.

15. A process as specified in claim 12 wherein said alkyl lithium initiator is normal butyl lithium.

16. A process as specified in claim 12 wherein said alpha olefin contains from 2 to 4 carbon atoms.

17. A process as specified in claim 16 wherein said alpha olefin is a member selected from the group consisting of ethylene and propylene.

18. A process as specified in claim 12 wherein said reaction mixture contains from 0.01 to 5 percent by weight of said alpha olefin.

19. A process as specified in claim 18 wherein said reaction mixture contains from 0.1 to 1 weight percent of said alpha-olefin.

20. A process for the homopolymerization of meta-diisopropenyl benzene monomer which results in the formation of poly-meta-diisopropenyl benzene with a low degree of intermolecular crosslinking comprising: polymerizing said meta-diisopropenyl benzene in a reaction mixture containing said meta-diisopropenyl benzene in an organic solvent containing at least about 80 weight percent tetrahydrofuran at a temperature of −60° C. or colder utilizing an alkyl lithium initiator in the presence of at least 0.01 percent by weight of at least one alpha-olefin selected from the group consisting of ethylene and propylene.

21. A process as specified in claim 20 wherein said alkyl lithium initiator is normal butyl lithium.

22. A process as specified in claim 21 wherein said temperature is about −80° C.

23. A process as specified in claim 22 wherein said organic solvent is tetrahydrofuran.

24. A process as specified in claim 23 wherein said reacion mixture contains from 0.1 to 1 weight percent of said alpha-olefin.

25. A process for the synthesis of polymers with a low degree of intermolecular crosslinking containing from about 1 weight percent to 100 weight percent diisopropenyl benzene and from 0 to about 99 weight percent of at least one other monomer comprising: polymerizing from about 1 to 100 weight percent diisopropenyl benzene and from 0 to about 99 weight percent of at least one other monomer in a reaction mixture utilizing an organic solvent containing at least 5 weight percent of at least one ether at a temperature of −40° C. or colder utilizing an alkyl lithium initiator in the presence of at least 0.01 weight percent based upon the total reaction mixture of at least one alpha olefin selected from the group consisting of ethylene and propylene.

26. A process as specified in claim 25 wherein said organic solvent contains at least about 80 weight percent tetrahydrofuran.

27. A process as specified in claim 26 wherein said temperature is −60° C. or colder.

28. A process as specified in claim 27 wherein said diisopropenyl benzene is meta-diisopropenyl benzene.

29. A process as specified in claim 28 wherein said alkyl lithium initiator contains from 2 to 6 carbon atoms.

30. A process as specified in claim 29 wherein said organic solvent is tetrahydrofuran.

31. A process as specified in claim 30 wherein said alkyl lithium initiator is normal butyl lithium.

32. A process as specified in claim 31 wherein said temperature is about −80° C.

33. A process for the synthesis of polymers with a low degree of intermolecular crosslinking containing from about 1 weight percent to 100 weight percent diisopropenyl benzene and from 0 to about 99 weight percent of at least one other monomer comprising: polymerizing from about 1 to 100 weight percent diisopropenyl benzene and from 0 to about 99 weight percent of alpha-methyl styrene in a reaction mixture utilizing an organic solvent containing at least 5 weight percent of at least one ether at a temperature of −40° C. or colder utilizing an alkyl lithium initiator in the presence of at least 0.01 weight percent based upon the total reaction mixture of at least one alpha olefin containing from 2 to 12 carbon atoms.

34. A process as specified in claim 33 wherein said diisopropenyl benzene is meta-diisopropenyl benzene.

35. A process as specified in claim 34 wherein said organic solvent contains at least about 80 weight percent tetrahydrofuran and wherein said temperature is −60° C. or colder.

36. A process as specified in claim 35 wherein said alkyl lithium initiator contains from 2 to 6 carbon atoms and wherein said organic solvent is tetrahydrofuran.

37. A process as specified in claim 36 wherein said alkyl lithium initiator is normal butyl lithium and wherein said temperature is about −80° C.

* * * * *